US007622892B2

United States Patent
Kim et al.

(10) Patent No.: US 7,622,892 B2
(45) Date of Patent: Nov. 24, 2009

(54) CONTACTLESS BATTERY CHARGER

(75) Inventors: Joon-Suh Kim, Anyang-si (KR);
Chang-Soo Lee, Incheon (KR)

(73) Assignee: Samsung Electronics Co., Ltd (KR)

( * ) Notice: Subject to any disclaimer, the term of this patent is extended or adjusted under 35 U.S.C. 154(b) by 348 days.

(21) Appl. No.: 11/501,963

(22) Filed: Aug. 10, 2006

(65) Prior Publication Data

US 2007/0046256 A1    Mar. 1, 2007

(30) Foreign Application Priority Data

Aug. 18, 2005 (KR) ............. 10-2005-0075732

(51) Int. Cl.
*H02J 7/00* (2006.01)
*H02J 7/04* (2006.01)
*A61L 2/24* (2006.01)
*H02B 1/00* (2006.01)

(52) U.S. Cl. ............. 320/108; 320/109; 320/139; 422/24; 361/600

(58) Field of Classification Search ........... 320/108, 320/109, 139; 422/24; 361/600
See application file for complete search history.

(56) References Cited

U.S. PATENT DOCUMENTS

2005/0156560 A1    7/2005    Shimaoka et al.

FOREIGN PATENT DOCUMENTS

| CN | 2308198 | 2/1999 |
| CN | 1322049 | 11/2001 |
| CN | 2596682 | 12/2003 |
| CN | 1647342 | 7/2005 |
| GB | 2389720 | * 12/2003 |
| KR | 10-2006-0107148 | 10/2006 |

* cited by examiner

*Primary Examiner*—Edward Tso
*Assistant Examiner*—Yalkew Fantu
(74) *Attorney, Agent, or Firm*—The Farrell Law Firm, LLP

(57) ABSTRACT

Disclosed is a contactless battery charger for simultaneously charging numerous portable terminals and battery packs, regardless of their type, when they are placed on the charger, as well as sterilizing and cleaning them. The charger includes a plate-shaped portion gradually depressed towards the center up to a predetermined depth so that a number of terminals and battery packs can be placed on the plate-shaped portion. The charger is adapted to simultaneously charge a number of battery packs in a contactless mode.

10 Claims, 4 Drawing Sheets

CONTACTLESS BATTERY CHARGER

PRIORITY

This application claims priority under 35 U.S.C. § 119 to an application entitled "Contactless Battery Charger" filed with the Korean Intellectual Property Office on Aug. 18, 2005 and assigned Serial No. 2005-75732, the contents of which are incorporated herein by reference.

BACKGROUND OF THE INVENTION

1. Field of the Invention

The present invention relates generally to a contactless battery charger, and in particular, to a contactless battery charger adapted to simultaneously charge multiple portable terminals and battery packs when mounted on the charger, regardless of their type, as well as to simultaneously sterilize and clean them.

2. Description of the Related Art

In general, portable communication apparatuses are classified into folder-type apparatuses, bar-type apparatuses, swing-type apparatuses, and sliding-type apparatuses. Portable communication apparatuses further include personal Digital Assistants (PDAs) and laptop computers. Portable communication apparatuses use a charged battery pack as their energy source; consequently battery chargers are indispensable accessories.

According to a currently used charging method, a battery pack is coupled to a charger for applying a voltage to the battery pack by means of a mechanical contact between their respective contact terminals. In a conventional charging system, during charging a charging terminal of a battery pack is in contact with a conductive output terminal, which is connected to a charger. In such a charging system, different types of battery packs have their own chargers, which cannot be used with other types of battery packs.

According to another conventional charging method, a connection cable is used to connect an interface connector, which is embedded in a terminal, to a charger in a pin mode.

However, conventional battery chargers tend to have poor contact, which is inherent in a mechanical contact mode. For instance, foreign substances may cover the contact terminal, through which power is supplied, and thereby interrupt the electric contact. Furthermore, the contact terminal of battery packs or chargers may become worn down, after extended use, and thus do not allow for the proper supply of power.

Conventional chargers typically have no compatibility with different types of battery packs. Therefore, in the conventional art, each time a new type of terminal is developed and manufactured, dedicated chargers must also be fabricated based on the size and shape of their battery pack, as well as the placement of the contact terminal. This increases the manufacturing cost of chargers.

In addition, conventional battery chargers have only a basic function for electrically connecting to battery packs while charging them. In other words, they incorporate no additional function for sterilizing or cleaning the terminals for removal of any foreign substances.

SUMMARY OF THE INVENTION

Accordingly, the present invention has been made to solve the above-mentioned problems occurring in the conventional art, and an object of the present invention is to provide a contactless battery charger adapted to simultaneously charge numerous battery packs, which are mounted on portable terminals.

Another object of the present invention is to provide a contactless battery charger having an ultraviolet sterilizer and an ultrasonic cleaner for sterilizing and cleaning portable terminals while being charged.

Still another object of the present invention is to provide a contactless battery charger incorporating a short-distance communication module for an additional function of transmitting/receiving data to/from portable terminals while charging, as well as a cylindrical speaker device for playing music files stored in the portable terminals together with the communication module so that users can enjoy music while the portable terminals are being charged.

In order to accomplish this object, there is provided a contactless battery charger for charging battery packs mounted on portable terminals, the charger including a plate-shaped portion gradually depressed towards a center of the charger up to a predetermined depth so that numerous portable terminals and battery packs can be placed on the plate-shaped portion. The contactless battery charger is adapted to simultaneously charge the battery packs in a contactless mode.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
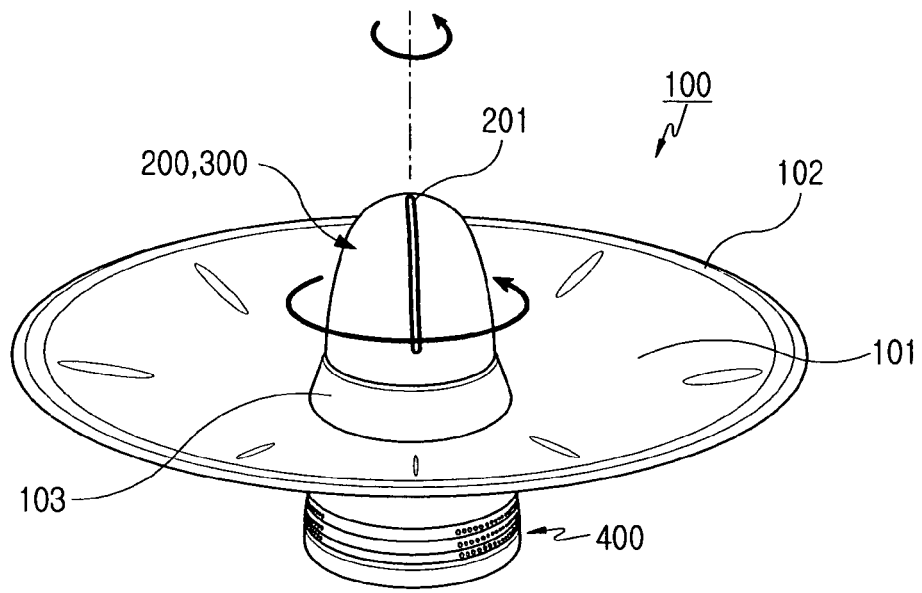
FIG. 1 is a perspective view illustrating the construction of a contactless battery charger according to the present invention.

Hereinafter, a contactless battery charger according to a preferred embodiment of the present invention will be described with reference to the accompanying drawings. In the drawings, the same or similar elements are denoted by the same reference numerals even though they are depicted in different drawings. In the following description, a detailed description of known functions and configurations incorporated herein has been omitted for clarity and conciseness.

Figure 2:
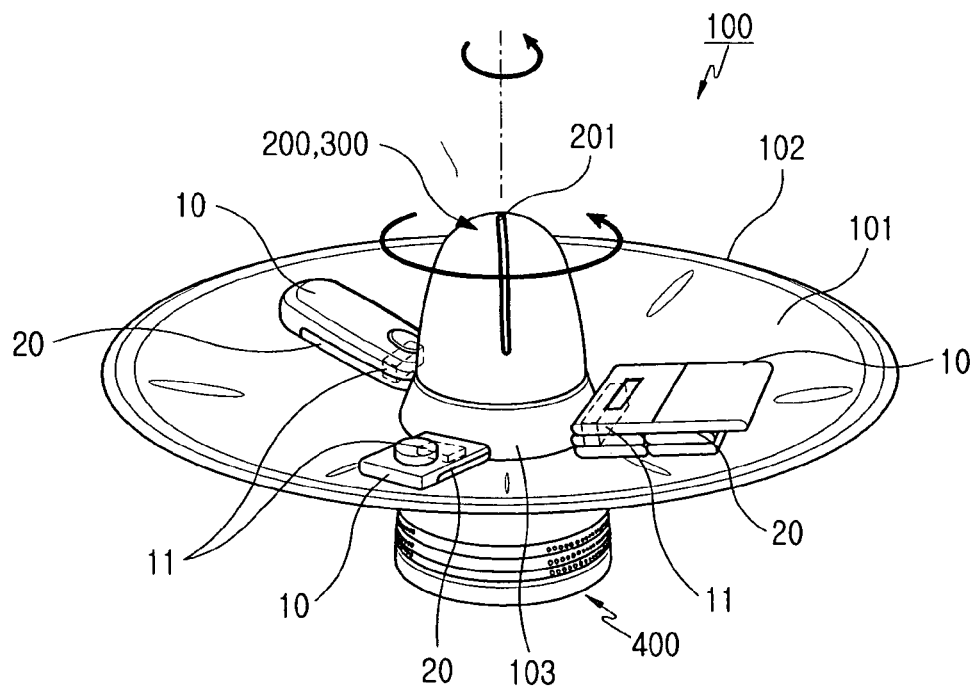
FIG. 2 is a perspective view illustrating a contactless battery charger according to the present invention while in use.

Referring to FIGS. 1 and 2, a contactless battery charger 100 has a plate-shaped portion so that numerous terminals 10 and battery packs 20 can be placed thereon regardless of their type, and is adapted to simultaneously charge numerous battery packs 20 in a contactless manner.

The principle of contactless charging will now be briefly described The charger 100 has a charger-side induction coil 103, and the battery packs 20 have battery-side induction coils 11. When the charger 100 is turned on, a voltage is applied to the charger-side induction coil 103 for establishing a magnetic field around it. As a result, mutual electromagnetic induction occurs at the battery-side induction coils 11, which are adjacent to the charger-side induction coil 103, and induced electromotive force is generated by the battery-side induction coil 11 according to Faraday's law. The AC voltage of the induced electromotive force is converted into a DC voltage by rectification circuits (not shown) inside the battery packs. The DC voltage is applied to the numerous charging units for charging the battery packs 20.

Figure 3:
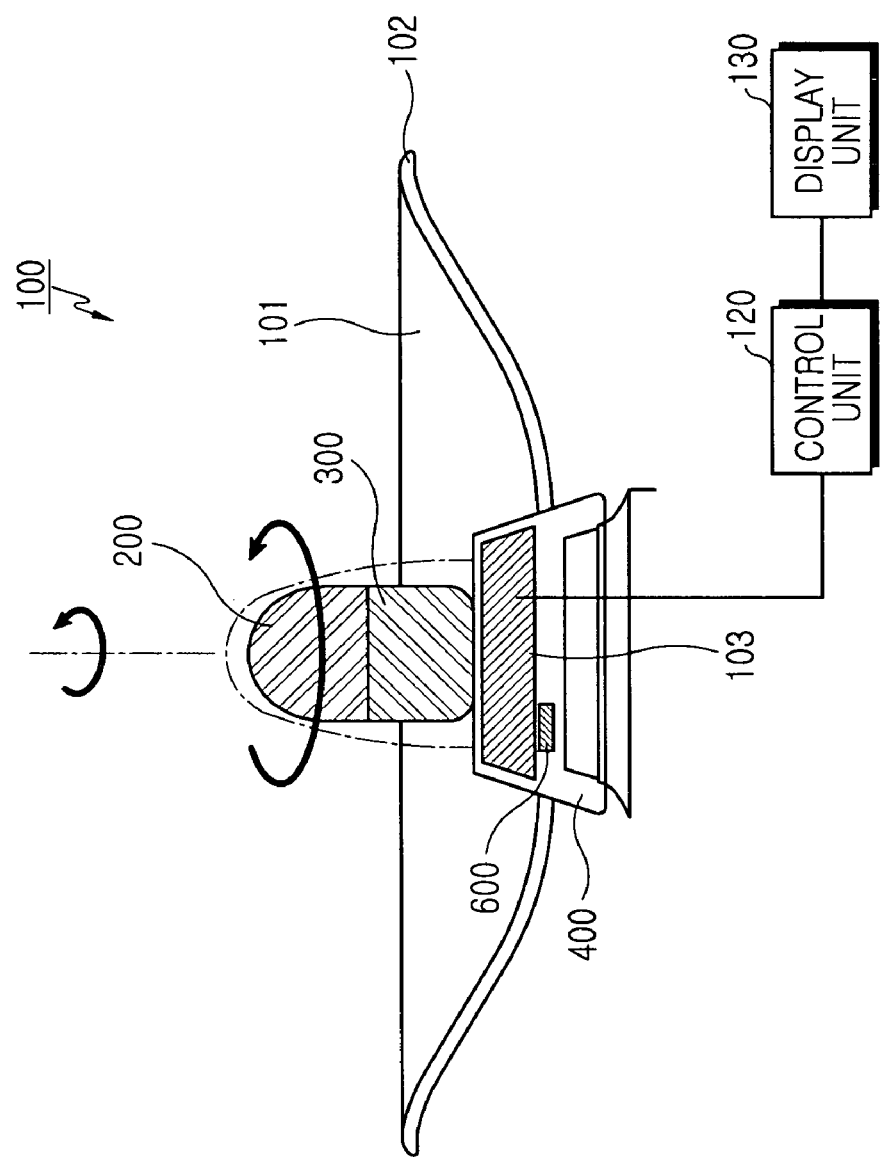
FIG. 3 is a lateral sectional view illustrating the construction of a contactless battery charger according to the present invention.
Figure 4:
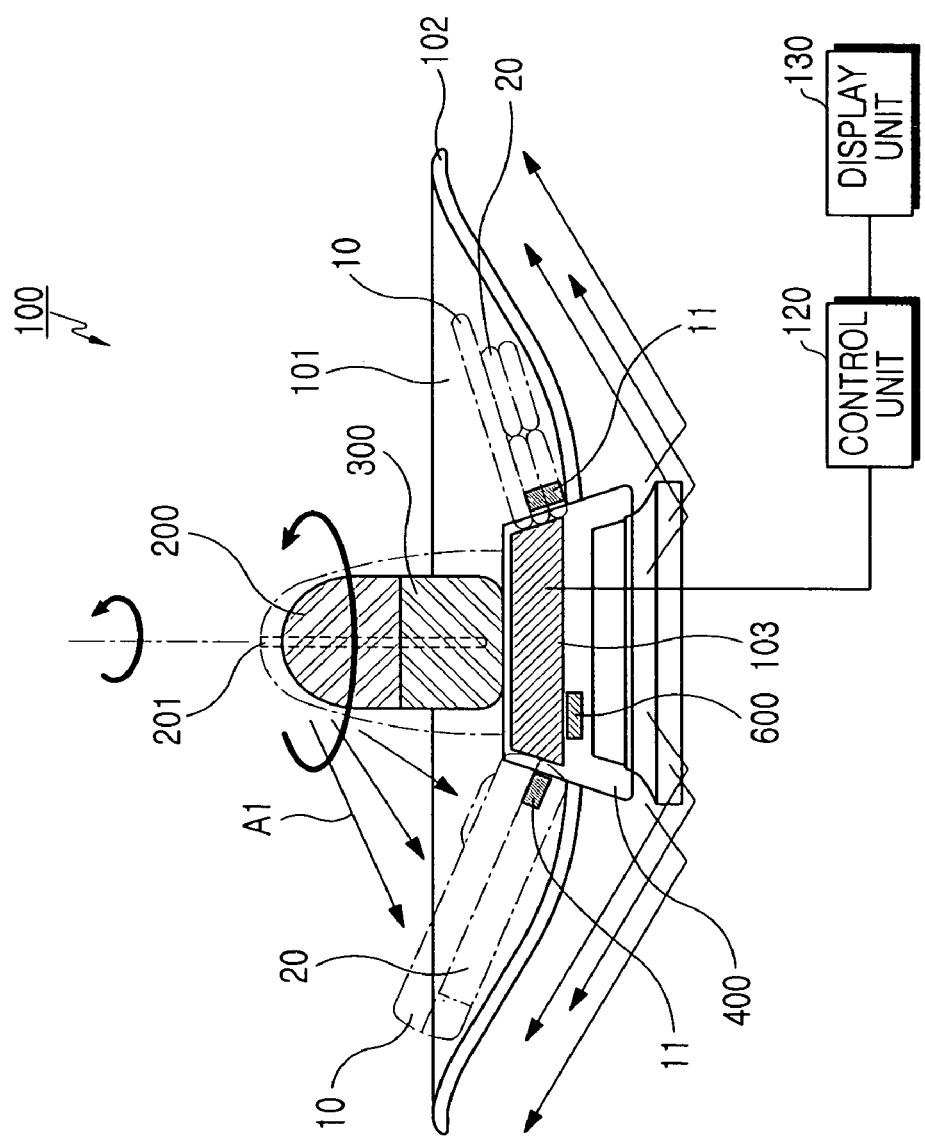
FIG. 4 is a lateral sectional view s illustrating a contactless battery charger according to an embodiment of the present invention while in use.

Referring to FIGS. 3 and 4, the charger 100 has a depression 101, the depth of which gradually increases towards the center up to a predetermined value, so that numerous battery packs 20 and terminals 10 can be placed thereon. The charger 100 incorporates a short-distance communication module 600 for short-distance transmission/reception with the terminals 10.

Referring to FIG. 4, the charger 100 has an ultraviolet sterilizer 200 positioned on its top and an ultrasonic cleaner 300 positioned adjacent to the sterilizer 200. The sterilizer 200 has an ultraviolet lamp 201 for radiating ultraviolet rays A1 towards the portable terminal 10 for sterilizing them. The ultrasonic cleaner 300 has an ultrasonic vibrator (not shown) for generating ultrasonic vibration and radiating it towards the terminals 10 for cleaning them.

Referring to FIGS. 3 and 4, the depression 101 of the charger 100 has a radiation region for ultrasonic rays A1 radiated from the ultrasonic lamp 201 and a vibration region for ultrasonic vibration generated by the ultrasonic vibrator (not shown). The ultraviolet sterilizer 200 and the ultrasonic cleaner 300 are rotated in the upper region of the charger 100 by a driving motor (not shown), which is positioned inside the charger 100.

Referring to FIG. 1, the charger 100 has a cylindrical speaker device 400 positioned on its lower portion for playing music files stored on the terminals 10.

Referring to FIG. 2, the charger 100 has an annular pad 102 extending along the outer periphery of the plate-shaped portion so that the terminals 10 are inclined towards the center of the charger 100.

Referring to FIGS. 3 and 4, the charger 100 includes a charger-side induction coil 103, a control unit 120, and a display unit 130.

The charger-side induction coil 103 is positioned at the center of the charger 100 in a cylindrical shape. When the charger 100 is turned on, a voltage is applied to the charger-side induction coil 103 for establishing a magnetic field around it. As a result, mutual electromagnetic induction occurs at the battery-side induction coils 11, and the AC voltage of induced electromotive force is converted into a DC voltage by rectification circuits (not shown) inside the battery packs 20. The control unit 120 controls the charging current based on the rated capacity required by the battery packs 20. The display unit 130 monitors the charged conditions of the battery packs 20 during charging and displays corresponding results.

Figure 5:
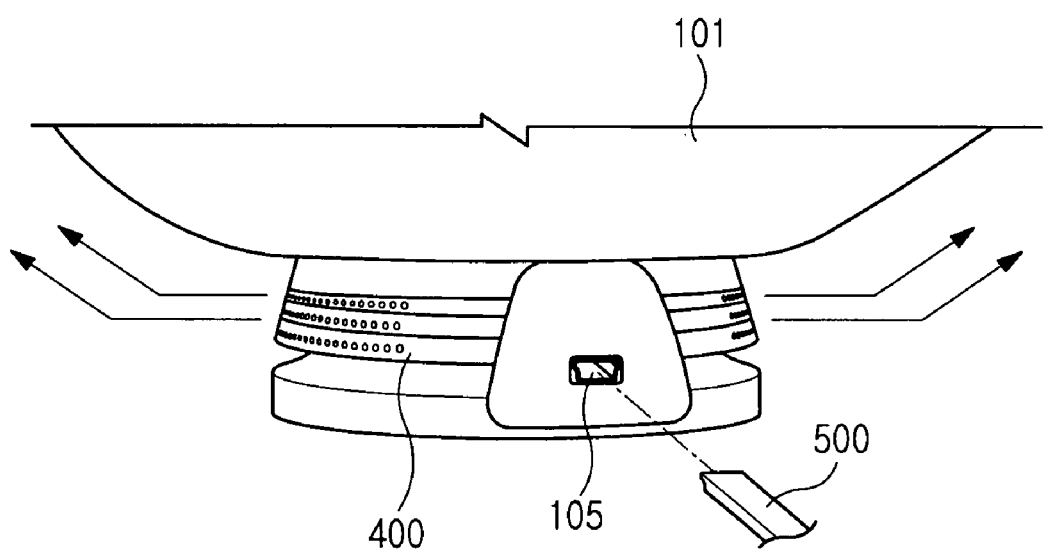
FIG. 5 is a perspective view illustrating a connection terminal of a contactless battery charger according to the present invention.

Referring to FIG. 5, the charger 100 has a connection terminal 105, which is connected to an external device 500 for supplying power to the charger 100.

The operation of the contactless battery charger according to a preferred embodiment of the present invention, which is constructed as above, will now be described in detail with reference to FIGS. 1 to 5.

Referring to FIGS. 1 to 5, when the contactless battery charger 100 is used to charge numerous terminals 10, the connection terminal 105, preferably positioned on the lower portion of the charger 100, is connected to an external device 500. The charger 100 is then supplied with power from the external device 500.

Referring to FIGS. 3 and 4, the charger 100 has a depression 101, the depth of which gradually increases towards the center up to a predetermined value, and an annular pad 102 extending along the outer periphery of the plate-shaped portion of the charger 100 so that portable terminals 10 are inclined towards the center when placed on the depression 101.

Referring to FIG. 2, when battery packs 20 mounted on portable terminals 10 are to be charged, the portable terminals 10 are placed on the annular pad 102. Since, the annular pad 102 of the charger 100 is foldable, numerous portable terminals 10 can be placed thereon.

Referring to FIGS. 3 and 4, the charger 100 has a charger-side induction coil 103 positioned at its center.

The charger 100 has a cylindrical shape, along the circumference of which the charger-side induction coil 103 is positioned.

When portable terminals 10 are placed on the charger 100, they are inclined towards the center of the charger 10.

Referring to FIG. 4, the charger-side induction coil 103 is connected to the battery-side induction coils 11 in a contactless manner. When the charger 100 is turned on, a voltage is applied to the charger-side induction coil 103 for establishing a magnetic field around it. As a result, mutual electromagnetic induction occurs at the battery-side induction coils 11, and the AC voltage of induced electromotive force is converted into a DC voltage by rectification circuits (not shown) inside the battery packs 20. The battery packs 20 are charged in this manner.

The control unit 120 of the charger 100 controls the charging current based on the rated capacity required by the battery packs 20. The display unit 130 monitors the charged condition of the battery packs 20 during charging and displays the result.

Referring to FIG. 4, the charger 100 has an ultraviolet sterilizer 200 positioned on the top of the adjacent ultrasonic cleaner 300 for sterilizing and cleaning the surface of the portable terminals 10. Particularly, the ultraviolet sterilizer 200 has an ultrasonic lamp 201, which radiates ultraviolet rays A1 towards the surface of numerous portable terminals on the annular pad 102 and sterilizes them. The ultrasonic cleaner 300 has an ultrasonic vibrator (not shown), which generates ultrasonic vibration for cleaning the terminals 10.

The depression 101 on the upper surface of the charger 100 has a radiation region for ultrasonic rays A1 radiated from the ultrasonic lamp 201 and a vibration region for ultrasonic vibration generated by the ultrasonic vibrator (not shown).

The ultraviolet sterilizer 200 and the ultrasonic cleaner 300 are rotated by a driving motor (not shown), which is positioned inside the charger 100.

Referring to FIGS. 2 and 4, the charger 100 has a speaker device 400 positioned on its lower portion. When a music file stored in a portable terminal 10 is to be played, data signals of the music file are transmitted to the short-distance communication module 600 of the charger 100 so that the speaker device 400 plays music based on the received signals.

As such, the charger 100 can play music files while charging numerous portable terminals.

While the invention has been shown and described with reference to certain preferred embodiments thereof, it will be understood by those skilled in the art that various changes in form and details may be made therein without departing from the spirit and scope of the invention as defined by the appended claims. For example, the present invention is applicable to all types of portable terminals.

What is claimed is:

1. A contactless battery charger for charging battery packs mounted on portable terminals, the charger comprising a plate-shaped portion for simultaneously charging the battery packs in a contactless mode, the plate-shaped portion gradually depressed towards a center of the charger up to a predetermined depth so that numerous portable terminals and battery packs placed on the plate-shaped portion are inclined towards the center.

2. The contactless battery charger as claimed in claim 1, further comprising an ultraviolet sterilizer having an ultraviolet lamp for radiating ultraviolet rays to the portable terminals for sterilizing the portable terminals, an ultrasonic cleaner having an ultrasonic vibrator for cleaning the portable terminals by using vibration of ultrasonic waves.

3. The contactless battery charger as claimed in claim 2, wherein the ultraviolet sterilizer is positioned on an upper portion and the ultrasonic cleaner is positioned adjacent to the ultrasonic sterilizer.

4. The contactless battery charger as claimed in claim 1, wherein a space is defined above an upper surface of the charger with a predetermined depth so that the portable terminals can be placed in the space, and the space provides a radiation region for an ultraviolet lamp and a vibration region for an ultrasonic vibrator.

5. The contactless battery charger as claimed in claim 1, further comprising a driving motor for rotating an ultraviolet sterilizer and an ultrasonic cleaner in an upper region of the charger.

6. The contactless battery charger as claimed in claim 1, further comprising a cylindrical speaker device positioned inside a lower portion of the charger.

7. The contactless battery charger as claimed in claim 1, further comprising a short-distance communication module for transmitting/receiving data to/from the portable terminals during charging.

8. The contactless battery charger as claimed in claim 1, further comprising an annular pad extending along an outer periphery of the plate-shaped portion so that the terminals are inclined towards the center of the charger.

9. The contactless battery charger as claimed in claim 1, further comprising:
   a cylindrical charger-side induction coil for establishing a magnetic field around the charger-side induction coil when the charger is supplied with power and a voltage is applied to the charger-side induction coil, a mutual electromagnetic induction occurring at battery-side induction coils by the magnetic field, and an AC voltage of induced electromotive force being converted into a DC voltage by rectification circuits inside the battery packs and charging the battery packs;
   a control unit for controlling a charging current based on a rated capacity required by the battery packs; and
   a display unit for monitoring charged conditions of the battery packs during charging and displaying corresponding results.

10. The contactless battery charger as claimed in claim 1, further comprising a connection terminal for electrical connection with an external device.

* * * * *

UNITED STATES PATENT AND TRADEMARK OFFICE
CERTIFICATE OF CORRECTION

PATENT NO. : 7,622,892 B2  Page 1 of 1
APPLICATION NO. : 11/501963
DATED : November 24, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 454 days.

Signed and Sealed this

Twenty-sixth Day of October, 2010

David J. Kappos
*Director of the United States Patent and Trademark Office*